(12) United States Patent
Klein

(10) Patent No.: US 11,773,624 B2
(45) Date of Patent: Oct. 3, 2023

(54) SAFE

(71) Applicant: Amos Klein, Haifa (IL)

(72) Inventor: Amos Klein, Haifa (IL)

( * ) Notice: Subject to any disclaimer, the term of this patent is extended or adjusted under 35 U.S.C. 154(b) by 840 days.

(21) Appl. No.: 16/318,814

(22) PCT Filed: Jul. 16, 2017

(86) PCT No.: PCT/IL2017/050803
§ 371 (c)(1),
(2) Date: Jan. 18, 2019

(87) PCT Pub. No.: WO2018/015947
PCT Pub. Date: Jan. 25, 2018

(65) Prior Publication Data
US 2019/0161021 A1    May 30, 2019

Related U.S. Application Data

(60) Provisional application No. 62/363,870, filed on Jul. 19, 2016.

(51) Int. Cl.
*E05B 65/00* (2006.01)
*E05G 1/00* (2006.01)
(Continued)

(52) U.S. Cl.
CPC .......... *E05B 65/0075* (2013.01); *B60R 7/087* (2013.01); *E05B 19/0005* (2013.01);
(Continued)

(58) Field of Classification Search
CPC ............... E05B 19/0005; E05B 45/005; E05B 65/0014; E05B 65/52; E05B 73/00;
(Continued)

(56) References Cited

U.S. PATENT DOCUMENTS 4,573,332 A * 3/1986 Ma .................. E05B 67/003
109/52
4,674,303 A    6/1987 Salcone, II
(Continued)

FOREIGN PATENT DOCUMENTS

DE     202009005970 U1    7/2009
WO       2006095138 A1    9/2006

OTHER PUBLICATIONS

Survival Reality, "GunVault NV200 NanoVault with Key Lock.", YouTube, (Jan. 8, 2012), URL: https://www.youtube.com/watch?v=Q3uqTwT51A4, (Oct. 18, 2017), XP054978126 [X] 1-7 * entire video, see pp. 6-13 of the ISA/237 *.

(Continued)

*Primary Examiner* — Christopher J Boswell
(74) *Attorney, Agent, or Firm* — William H. Dippert; Laurence A. Greenberg; Werner H. Stemer

(57) ABSTRACT

A transportable safe configured to be secured to a solid object and withstand attempts to remove content from the safe or the safe by an unauthorized entity. The transportable safe comprises a safe body, a fastener attached to the safe body and at least one connector configured to connect between the fastener and the solid object. The connector is configured to be concealed at least when the safe is secured.

19 Claims, 5 Drawing Sheets

(51) Int. Cl.
*E05B 73/00* (2006.01)
*E05G 1/04* (2006.01)
*E05B 19/00* (2006.01)
*E05B 45/00* (2006.01)
*E05B 65/52* (2006.01)
*B60R 7/08* (2006.01)
*E05G 1/024* (2006.01)
*E05G 1/10* (2006.01)

(52) U.S. Cl.
CPC ............ *E05B 45/005* (2013.01); *E05B 65/52* (2013.01); *E05B 73/0005* (2013.01); *E05B 73/0023* (2013.01); *E05G 1/005* (2013.01); *E05G 1/04* (2013.01); *E05G 1/024* (2013.01); *E05G 1/10* (2013.01)

(58) Field of Classification Search
CPC ............ E05B 73/0005; E05B 73/0023; E05B 65/0075; E05G 1/005; E05G 1/04; E05G 1/10; E05G 1/024; B60R 7/087
See application file for complete search history.

(56) References Cited

U.S. PATENT DOCUMENTS

| | | | | |
|---|---|---|---|---|
| 4,731,912 A * | 3/1988 | Boriskie | ............ | A44B 11/2576 24/579.11 |
| 4,905,855 A * | 3/1990 | Troiano | ................ | F17C 13/084 220/768 |
| 4,961,251 A * | 10/1990 | Smith | ................ | A44B 11/2576 24/633 |
| 5,285,833 A * | 2/1994 | Haxby | ..................... | A45C 1/04 150/102 |
| 5,542,590 A | 8/1996 | Pfitzenmaier | | |
| 7,116,224 B2 * | 10/2006 | Mickler | .................. | F41C 33/06 340/568.1 |
| 7,305,858 B1 * | 12/2007 | Wu | ......................... | E05G 1/005 109/47 |
| 7,866,505 B2 * | 1/2011 | Perlman | ................. | A45C 13/18 220/835 |
| 8,297,667 B2 * | 10/2012 | Pauken | ............... | E05B 73/0005 292/169.14 |
| 8,827,095 B1 | 9/2014 | Sackett | | |
| 9,345,300 B2 * | 5/2016 | Park | ..................... | E05B 73/0005 |
| 9,364,112 B2 * | 6/2016 | Sundaresan | ......... | E05B 73/0005 |
| 10,000,158 B2 * | 6/2018 | Darrow | ..................... | B60N 3/10 |
| 10,232,790 B1 * | 3/2019 | Adrain | ..................... | E05G 1/00 |
| 10,301,851 B1 * | 5/2019 | Cummings | ......... | E05B 73/0005 |
| 10,632,880 B2 * | 4/2020 | Lehtonen | ................ | B60N 2/58 |
| 2002/0148395 A1 * | 10/2002 | Judge | ................. | E05B 73/0005 109/52 |
| 2012/0125494 A1 * | 5/2012 | Avganim | ............. | E05B 73/0005 150/101 |
| 2012/0298018 A1 * | 11/2012 | McCabe | ................. | E05G 1/005 109/51 |
| 2015/0343958 A1 | 12/2015 | McGoldrick et al. | | |

OTHER PUBLICATIONS

"Store N' Go Booster", Safety 1st, (May 19, 2015), URL: https://web.archive.org/web/20150519044518/http://int.safety1st.com/our-products/car-seats/chil d-car-seats-boosters/us-store-n-go-booster.aspx, (Nov. 29, 2017) [Y] 18, 19 'entire document *.

* cited by examiner

SAFE

CROSS-REFERENCE TO RELATED APPLICATIONS

The present application is a National Phase filing under 35 U.S.C. § 371 of International Patent Application No. PCT/IL2017/050803, filed Jul. 16, 2017, which is based upon and claims the benefit of the priority date of U.S. Provisional Patent Application Ser. No. 62/363,870, filed Jul. 19, 2016, each of which is expressly incorporated herein by reference in its entirety.

FIELD

The present invention relates to safes. More particularly, the present invention relates to safes in vehicles.

BACKGROUND

A safe is a secure lockable storage unit used for securing valuable objects, for example against theft. In contrast to safes installed in buildings, safes in vehicles are vulnerable to quick break-in attempts and theft of the entire safe including its content, due to the relative light weight and small size of the safe, as well as the relative ease to break into a vehicle compared to a building. Therefore there is a need for a safe, particularly a safe on a vehicle, that is less vulnerable to breakage-in and theft of the entire safe.

SUMMARY

Brief Description of the Drawings

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1:
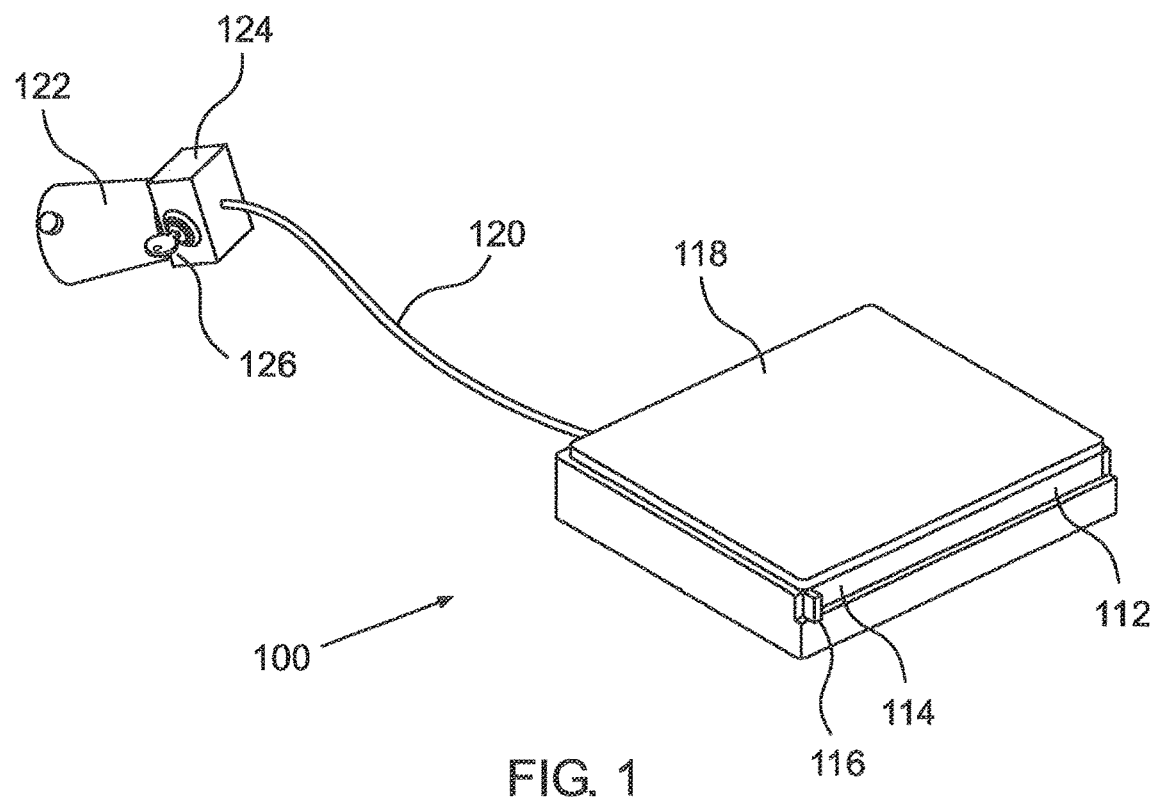
FIG. 1 schematically illustrates a safe having a secured connection to a vehicle according to an exemplary embodiment.

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

According to one embodiment, the present invention provides a safe configured to withstand attempts to get access to its content by an unauthorized entity. According to another embodiment, the present invention provides a safe that is configured to withstand attempts to remove the safe by an unauthorized entity from a place where the safe is placed and secured. According to a further embodiment, the present invention provides a safe that is concealed, thus making it hard to locate by an unauthorized entity. The authorized user can transport the safe from one place to the other and secure it during a journey. The safe can be carried and safely secured in any place.

According to a preferred embodiment, the present invention provides a safe configured to be placed in a vehicle. According to another preferred embodiment, the present invention provides a safe configured to be concealed in a prior art child safety seat for a vehicle. According to yet another preferred embodiment, the present invention provides a child safety seat for a vehicle configured to accommodate a safe. According to still another preferred embodiment, the present invention provides a child safety seat for a vehicle, comprising a safe. It should be mentioned that the vehicle can be any type of vehicle having closed space for passengers such as tracks, private vehicles, airborne vehicles, etc. The safe can be also connected to two wheeled vehicles such as a motorcycle or even un-motorized vehicles such as bicycle. The user can easily transfer the safe from one place to the other while it can be safely secured also when the user is in a house or a flat or any other space.

The term "child safety seat" as disclosed herein refers to any type of seat configured to accommodate a baby, infant, toddler, or child in a vehicle, for example but not limited to, a baby safety seat, a booster seat and the like.

The term "unauthorized entity" as disclosed herein refers to any entity that is not authorized to open the safe, get access to the content of the safe, remove the safe from a place where it is placed, or a combination thereof. Examples of an entity include, but not limited to, a person, a machine operated by a person, a robot, and the like.

According to one embodiment, the safe of the present invention is made of any material known in the art that is suitable for making a safe that safely secures its content. Examples of materials of which the safe of the present invention is made include, but not limited to, metal—for example, but not limited to, steel, stainless steel, aluminum, titanium, copper, brass, alloy of metals such as steel and aluminum, and the like; synthetic material—for example, but not limited to, any kind of plastic, para-aramid synthetic fiber—also known as Kevlar, polyethylene, high modulus polyethylene, polypropylene, polyvinyl chloride, polyester, armored rubber, fiberglass, fiberglass reinforced plastic, and the like; and natural material—for example, but not limited to, wood, processed wood, glass, ceramic material, armored compressed charcoal, and the like. According to another embodiment, the safe of the present invention is made of blowproof material.

According to one embodiment, the safe of the present invention comprises at least one lock, configured to securely close the safe and prevent opening of the safe and getting access to the contents of the safe by an authorized entity. The term "lock" as defined herein refers to any mechanical or electronic fastening device known in the art that is released by physical object, by supplying secret information, or by any combination thereof. Examples of a physical object that releases a lock include, but not limited to, a key, keycard, fingerprint, radio-frequency identification card—also known as RFID card, security token, and the like. Examples of secret information that releases a lock include, but not limited to, a keycode, password and the like. Any lock known in the art is under the scope of the present invention, for example but not limited to, a key lock, combination lock, electric lock, electromagnetic lock, keycard lock, smartphone operated lock and the like, or any combination thereof.

According to another embodiment, the safe of the present invention comprises at least one fastener, configured to fasten the safe to a solid object. A "solid object" as defined herein refers to any solid object known in the art to which a safe may be fastened. According to a preferred embodiment, the solid object is part of a vehicle, for example, but not limited to, a vehicle's floor, a seat, a glove compartment, a trunk, and the like. According to another preferred embodiment, the solid object is an accessory of a vehicle, for example, but not limited to, a child safety seat and the like. The solid object can be of any vehicle or a close space.

According to yet another embodiment, the fastener is configured to fasten the safe to a solid object in a manner that prevents easy removal of the safe. Examples of such fastener include, but not limited to, hook and loop fastener—also known as Velcro, a rigid fastener such as screws, rivets, rods, metal cables such as titanium cable, steel cables and stainless steel cables, chains, para-aramid synthetic fiber (Kevlar) strips, and the like.

According to a further embodiment, the fastener is configured to fasten the safe to an existing fastening element attached to a solid object. Examples of an existing fastening element attached to a solid object include, but not limited to, a vehicle's seat belt, a buckle of a vehicle's seat belt, an attachment point of a child safety seat in a vehicle—for example ISOFIX which is the international standard for a child safety seat in a vehicle, and the like.

According to an additional embodiment, the fastener is configured to fasten the safe to a solid object as described above, but further to be released only by an authorized entity. Accordingly, the fastener further comprises a lock as defined and described above. The safe can be removed from the vehicle and is configured to be transported by the user. The user can fasten the safe to another solid object of another vehicle or any other place where it should be accommodated.

According to one embodiment, the safe is configured to withstand attempts to break it in within a short period of time. According to another embodiment, the safe is configured to withstand attempts to break it in within a period of up to substantially five minutes. According to yet another embodiment, the safe is configured to withstand attempts to break it in within a period of up to substantially two minutes.

According to one embodiment, the safe is configured to withstand attempts to break it in by using methods and machinery not involving heat, for example, but not limited to, mechanically-operated or electrically-operated breakage tools, sowing tools and devices, and the like.

According to one embodiment, the fastener of the safe is configured to withstand attempts to release it or break it by an unauthorized entity—namely attempt to steal the safe, within a short period of time. According to another embodiment, the fastener of the safe is configured to withstand attempts to release it or break it within a period of up to substantially five minutes. According to yet another embodiment, the fastener of the safe is configured to withstand attempts to release it or break it within a period of up to substantially two minutes.

According to one embodiment, the fastener of the safe is configured to withstand attempts to release it or break it by using methods and machinery not involving heat, for example, but not limited to, mechanically-operated or electrically-operated breakage tools, sowing tools and devices, and the like.

According to one embodiment, the safe is configured to be concealed, thus making it hard to locate by an unauthorized entity. Any mechanism and method for concealing a safe, known in the art, is under the scope of the present invention, for example, but not limited to, placing the safe under a seat, placing the safe in a gloves compartment, concealing the safe in a spare wheel compartment, concealing the safe inside a child safety seat, and the like.

According to another embodiment, the safe is concealed in a part of a vehicle, for example but not limited to, a seat, trunk, and the like. According to yet another embodiment, the safe is concealed in an accessory of a vehicle, for example but not limited to, a child safety seat. According to a preferred embodiment, a child safety seat comprises a safe under a seat surface of the child safety seat. The safe comprises all the features described herein.

Some of the places for concealing a safe are narrow and provide a small space for placing the safe. Therefore, according to one embodiment, the safe is collapsible, thus allowing adjustment of the volume of the safe to the space where the safe is to be placed. According to another embodiment, the safe is collapsible in an accordion-like manner. Thus, when the safe is placed in a place having enough free space, the safe is fully expanded, and when the safe is placed in a place with a small free space, the safe is collapsed to adjust the volume of the safe to the free space. According to one embodiment, the safe is configured to collapse to a volume that allows placing the safe on a vehicle's floor and concealing the safe by covering it with a cover—for example, but not limited to, a fabric sheet, a vehicle's mat, and the like. According to another embodiment, the safe is configured to collapse to a volume that allows placing the safe under a vehicle's seat. According to yet another embodiment, the safe is configured to be collapse to a volume that allows placing the safe in a glove compartment. According to still another embodiment, the safe is configured to collapse to a volume that allows placing the under a child safety seat.

The present invention further provides a child safety seat that is configured to accommodate a safe comprising all the features described herein in a manner that conceals the safe. According to one embodiment, the child safety seat comprises a compartment configured to accommodate and conceal a safe. According to another embodiment, the compartment is positioned under a seat surface of the child safety seat.

According to one embodiment, the safe further comprises an opening configured to allow placement of small objects in the safe and not allow removal of small objects from the safe. According to another embodiment, the opening is an aperture configured to allow placement of small objects, like rings or coins in the safe, but not allow removal of rings or coins from the safe. According to yet another embodiment, the opening is a slot configured to allow placement of narrow objects like notes, checks, bills and the like, in the safe, but not allow removal of narrow objects from the safe.

According to one embodiment, the safe further comprises an alarm. According to another embodiment, the alarm is configured to be actuated when there is an attempt to break-in the safe. According to yet another embodiment, the alarm is configured to be actuated when there is an attempt to open at least one lock of the safe by an unauthorized entity. According to still another embodiment, the alarm is configured to be actuated when there is an attempt to remove the safe from a place where it is placed by an unauthorized entity. According to a further embodiment, the alarm is configured to be actuated when there is an attempt to release or break at least one fastener of the safe by an unauthorized entity. According to yet a further embodiment, the alarm is configured to be actuated when there is an attempt to open at least one lock of a fastener of the safe by an unauthorized entity or the lock of the safe itself.

Any type of alarm known in the art is under the scope of the present invention, for example, but not limited to, an alarm comprising a sound-making element like a siren or a bell or a loudspeaker, an alarm configured to transmit a signal to the owner of the safe, security authorities and the like by sending a message to a phone or computing device, or a smartphone or the like, or any combination thereof.

According to one embodiment, the safe further comprises a positioning system configured to determine the location of the safe. Any positioning system known in the art, and its mechanism and method for providing the location of the safe to a user or any other entity, is under the scope of the present invention, for example but not limited to, global systems like the global positioning system (GPS), and the like.

According to one embodiment, the weight of the safe is light, allowing mobility of the safe by hand, without requiring any further tools or mechanism for carrying the safe. According to another embodiment, the weight of a vehicle accessory comprising a safe, for example but not limited to, a child safety seat comprising a safe, is light, allowing mobility of the vehicle accessory comprising a safe by hand, without requiring any further tools or mechanism for carrying the vehicle accessory comprising safe. According to a further embodiment, the weight of the safe is up to substantially 7 kg. According to yet a further embodiment, the weight of the vehicle accessory comprising a safe is up to substantially 7 kg.

FIG. 1 schematically illustrates a safe having a secured connection to a vehicle according to an exemplary embodiment. Safe body 10 is configures to be in size that can be positioned in a concealed place within a car, therefore, it's size is limited to about several centimeters to several tens of centimeters. The size of the safe will be determined according to its desired positioning in the vehicle. Safe 100 in this case is a box that is provided with a shuttered opening 112 through which money, documents, mobile computer, smartphone or the like can be inserted into the safe 100. The shutter 114 of opening 112 can be opened through a hinge in the side of the opening using a handle 116. Alternatively, the upper side 118 of the safe 100 can be opened as well or not. Connected to the safe 100 is a fastener, a relatively elongated cable 120 that is connected to the safe in a permanent and solid connection. Cable 120 should be flexible, however strong enough to securely fasten and connect the safe 100 to the vehicle as will be shown and explained herein after. The cable 120 can be a wire or wires rope made of metal, metallic alloy, reinforced plastic materials and the like.

The cable is provided at its end with a connector adapted to fit a car's female buckle, an Isofix connector or any other connector (cannot be seen in FIG. 1 since it is concealed) that can connect to a solid part of the car. This connector is placed within a housing 122 that can be arranged in any suitable shape, in this case, a cylinder that conceals the connector. The connector can be concealed in any other manner known in the art. The connector is attached to the cable 120 and is housed within the housing 122 so as to be concealed at least when it is secure. The housing 122 is connected at its closed side to a box 124 that is enclosing the cable 120. The box 124 is provided with an inner mechanism that can be in two states—a state in which the box 124 configured to be loose from the cable 120 so that it can slide along the cable, and a state in which the box is fixed in a predetermined place onto the cable 120. The box 124 is provided with a key 126 adapted to switch the inner mechanism from one state to the other and vice versa.

Figure 2:
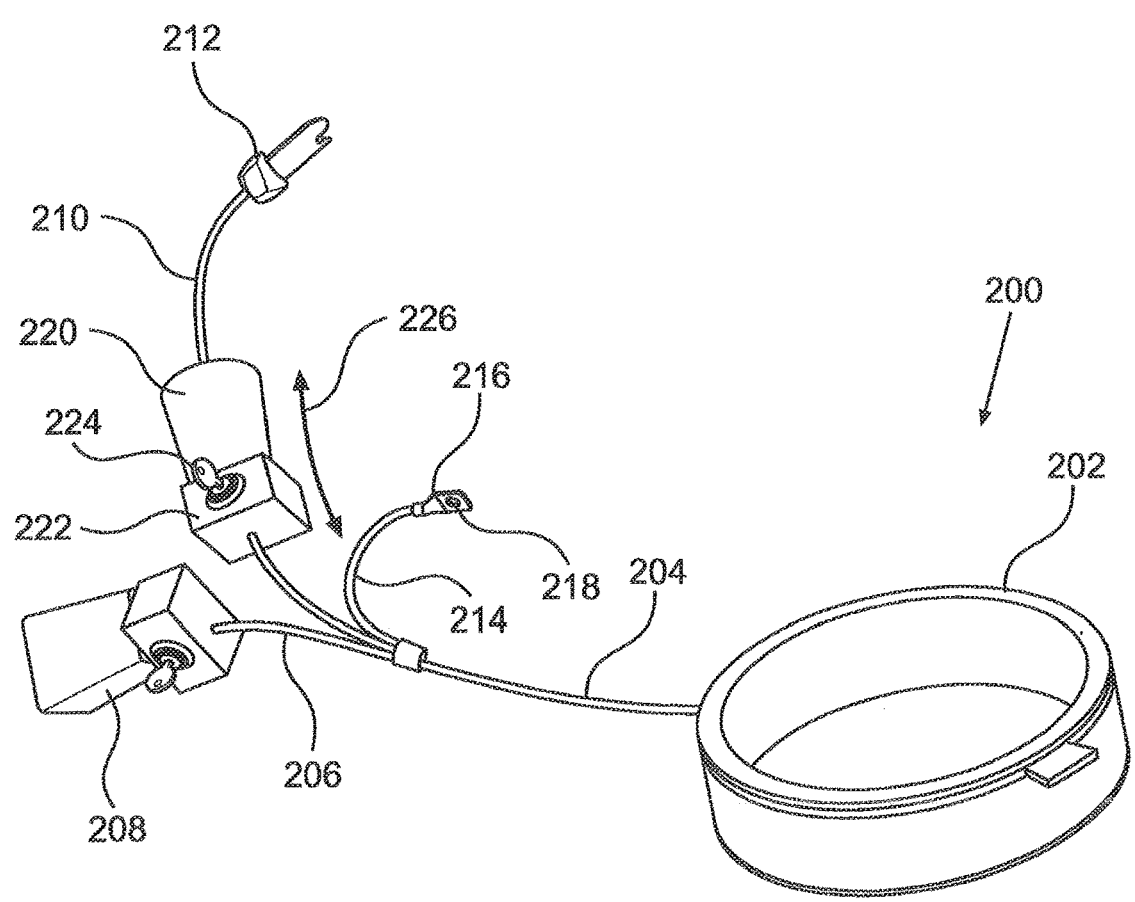
FIG. 2 schematically illustrates a safe having several secured connections to a vehicle according to another exemplary embodiment.

Reference is now made to FIG. 2 illustrating a safe having several secured connections to a vehicle according to another exemplary embodiment. Safe 200 in this case is configured to be rounded with an opening 202 from which the cover was removed from illustrative purposes. Safe 200 is connected to a cable 204 that is configured to connect to a part in the vehicle. In this case, the cable 204 splits into three possible cables—a first cable 206 that is connected to a standard female buckle (not seen) concealed within a housing 208, a second cable 210 that is connected to an Isofix connector 212, and a third cable 214 connected to a different connector 216 provided with a hole 218. Looking at cable 210, housing 220 connected to box 222 is shown to be in the second state that was previously discussed, in which the key 224 enables the box 222 carrying the housing 220 to slide on cable 210 in directions shown by bi-directional arrow 226.

When the user wants to secure the safe 200 to the vehicle and leave his belonging secured within the vehicle's safe, he connects the Isofix connector 212 to the appropriate Isofix loop of the vehicle and then slides the box 222 towards the Isofix connector 212 until the connector is fully concealed within housing 220, as shown in FIG. 1. He or she secures the positioning of the box 222 and the housing 220 using the key 224 so that the housing accommodated the Isofix connector 212 and takes the key with him. An intruder cannot access the Isofix connector to release it from the vehicle. When the user returns to the vehicle, he can use the key in order to release the box from the cable, slide it backwardly so as to expose the Isofix connector and release the safe. It should be mentioned that any other mechanism such as a flexible mechanism in which the connectors are concealed within a housing that can be withdrawn or retracted so as to reveal the connectors can be implemented in the secure safe.

Figure 3A:
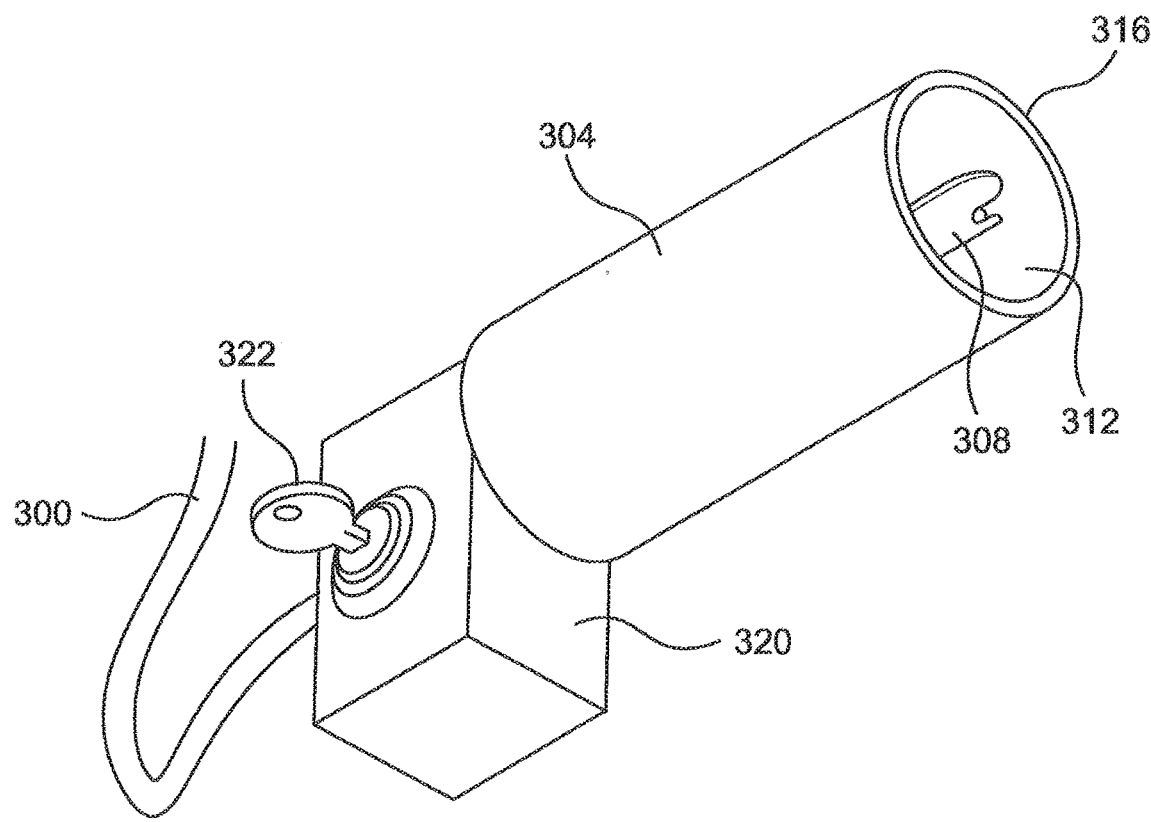
FIG. 3A illustrates the secured connection to be connected to an Isofix mechanism of a vehicle in accordance with an exemplary embodiment.
Figure 3B:
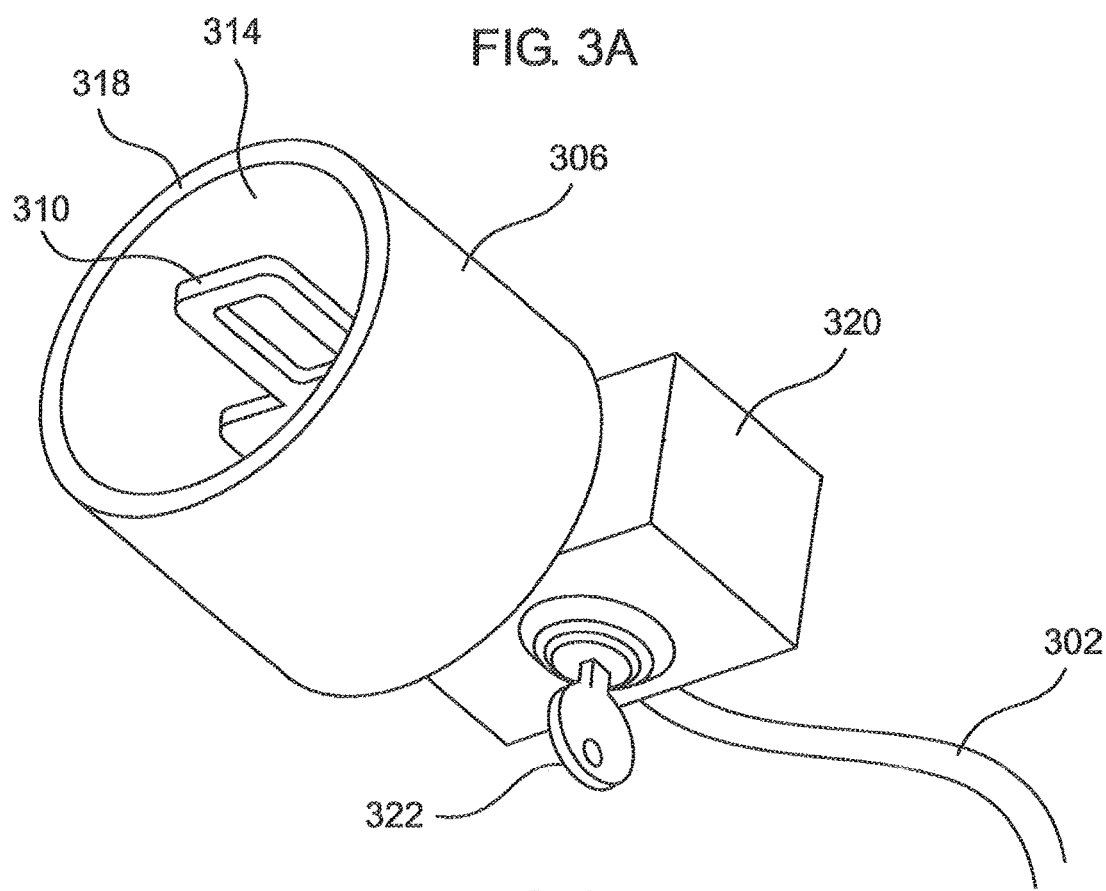
FIG. 3B illustrates the secured connection to be connected to a standard buckle mechanism of a vehicle in accordance with an exemplary embodiment.

Reference is now made to FIGS. 3A and 3B illustrating the secured connection to be connected to an Isofix mechanism or a buckle of a vehicle in accordance with exemplary embodiments. The exemplary embodiments are similar to the ones shown in FIGS. 1 and 2, however they are shown from a different angle so as to clarify the structure. The ends of cables 300 and 302, respectively, are provided with a housing 304 and 306, respectively, adapted to accommodate an Isofix 308, a buckle 310, or any other possible connection, whether available in the industry or will be in the future. The housing has an opening 312 and 314, respectively, through which the Isofix or buckle are exposed, while the edges 316 and 318, respectively, of the housings are at the same height of the Isofix end or the buckle's end or are slightly longer than the end of the buckle or Isofix.

It should be noted that the housings 304 and 306 can be designed to adapt to the size of the connector that is accommodated within.

A box 320 that is connected to the housing and can slide upon cable 300 or 302, depend on the state of the key 322, as explained herein before.

Figure 4:
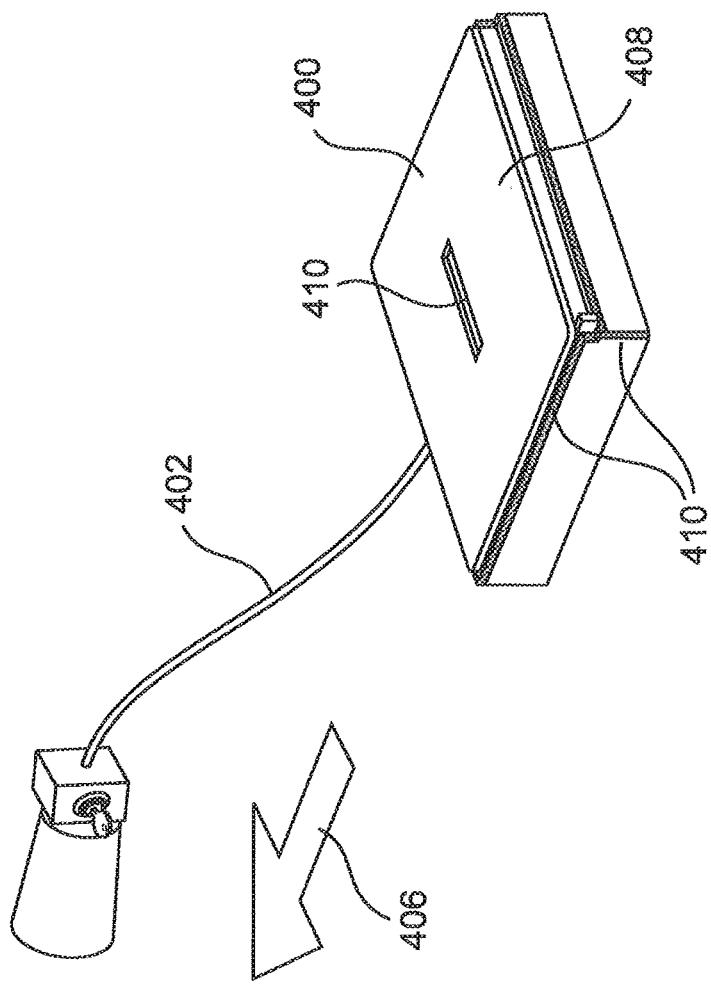
FIG. 4 schematically illustrates positioning of a safe into a child buster of a vehicle.
Figure 4:
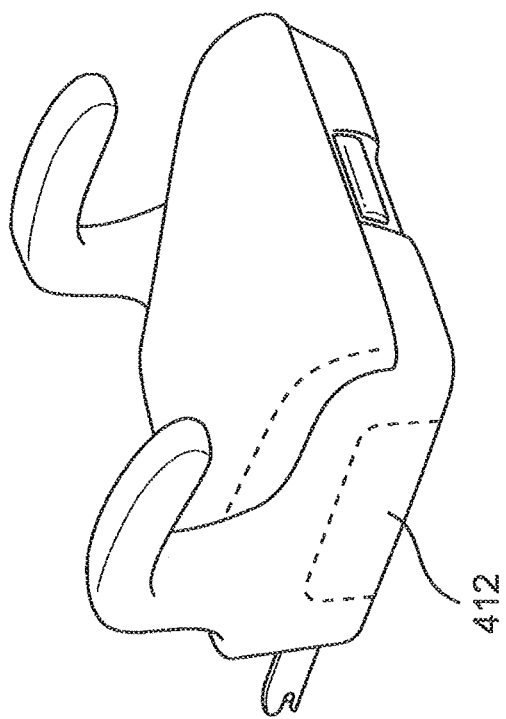

Reference is now made to FIG. 4 illustrating positioning of a safe into a child buster of a vehicle. A safe 400 provided with a cable 402 and a housing with a connector as explained herein before is accommodated beneath a child's booster 404. As mentioned herein before in details, the booster can be designed with the safe within the booster in a dedicated place indicated in the figure as 412, or the safe can be an add-on on a standard booster. In any case, the resultant booster is integrated with the safe. The safe 400 can be detached and/or connected to the booster as indicated in the arrow 406. Safe 400 can be in any desired shape and size as long as in can be positioned beneath the booster without disturbing. Safe 400 can be opened from the upper side that may act as a safe door 408 so as to insert relatively large articles into the safe while it is possible to insert coins or bills through a slot 410 that can be positioned in the safe's door 408 or on the sides.

Optionally, rubber stripes 410 are provided on the sides of the safe's 400 box in the connection points between the sides in order to isolate the safe's interior.

Optionally, the safe can be formed from two shell-like structures that open in a sliding motion one on top of the other. This configuration is more difficult to brake through.

Figure 5:
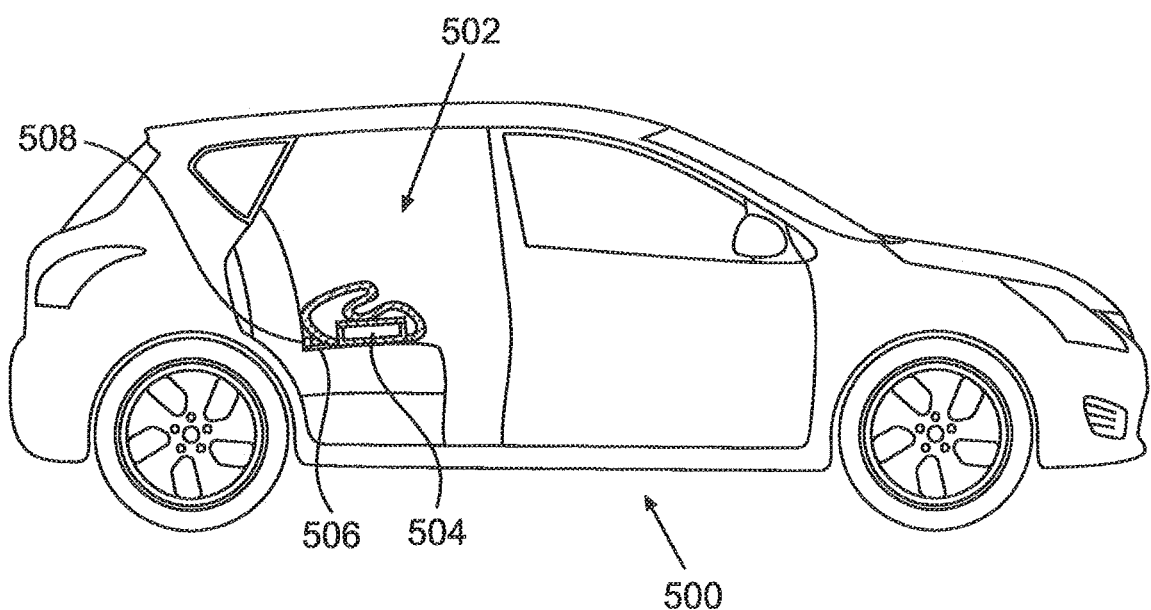
FIG. 5 schematically illustrates a cross sectional view of a buster with a hidden safe attached to the car's safety belt buckle in accordance with an exemplary embodiment.

Reference is now made to FIG. 5 schematically illustrating a cross sectional view of a booster with a hidden safe attached to the car's safety belt buckle in accordance with an exemplary embodiment. Booster 502 is positioned within a car 500. The booster 502 is shown in a cross sectional view by which it reveals a safe 504 hidden within the bottom portion of the booster, beneath the seat onto which a toddler is supposed to seat. The safe 504 within the booster is connected by a cable 506 as the one shown in FIG. 1, as an example. The end of the cable 506 is attached to the seat belt female buckle portion (not shown in the figure) while the housing 508 is covering the connection between the two portions of the buckle. An intruder in the car will not notice that there is any safe in the booster and in the car, however, if indeed someone notices it, there is no approach to the buckle so as to separate the two portions of the buckle and remove the safe from the vehicle 500.

Figure 6:
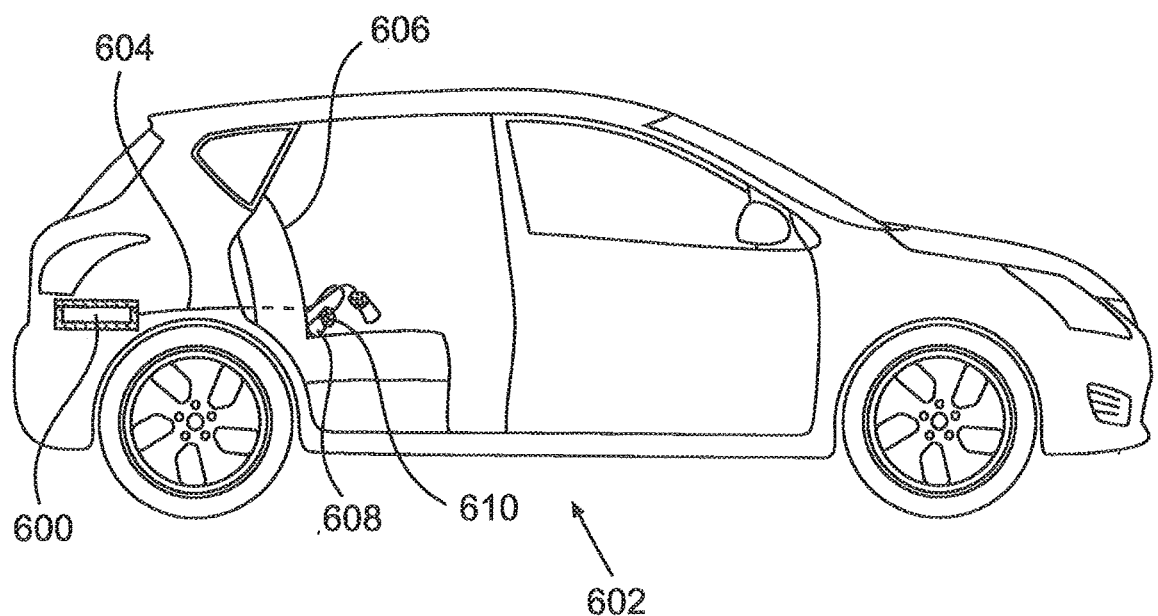
FIG. 6 schematically illustrates a safe having secured connection positioned in a back of a car and secured to a car's buckle in accordance with an exemplary embodiment.

Reference is now made to FIG. 6 illustrating a safe having secured connection positioned in a back of a car and secured to a car's buckle in accordance with an exemplary embodiment. Safe 600 is provided in the vehicle 602 within the trunk of the vehicle, where it cannot be seen to a person that looks through the windows of the car in order to check whether there is something valuable in the vehicle. Safe 600 is provided with a cable 604 that, as mentioned herein before, is relatively flexible and long enough to be transferred from the trunk, through the back seats 606 of the vehicle, where its path is shown in dash line. As indicated hereinbefore, at the end of the cable 604, there is a connector that can be an Isofix, connector or a buckle connector as well as any other connector. The connector is concealed within a housing 608 that is connected to a box 610 adapted to have two states, a state in which the box and the housing are sliding on the cable and a fixed state in which the box and housing are fixed. In this case and in order to fix the safe 600 within the trunk of the vehicle 602, the connector is connected to one of the standard connectors in the car, a buckle or an Isofix (cannot be seen in this figure). Then, the housing and the box are slide onto the cable so as to conceal and accommodate the connection between the buckles and fixed while housing the connection. An intruder that will look at the interior of the car will not be able to see the safe and if he will get into the car, he will not be able to easily open the connection so as to release the safe from it's connection. When the person that is authorized wants to take the safe out of the car, he needs to release the box and the housing from their grip on the cable using the key, and slide it backwardly so as to allow access to the connection. The connection then can be released and the safe can be taken.

Figure 7A:
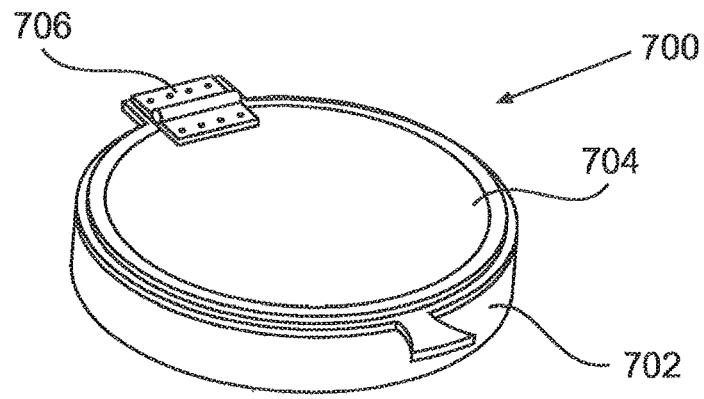
FIGS. 7A-7C illustrate an extendable safe in accordance with an exemplary embodiment.
Figure 7B:
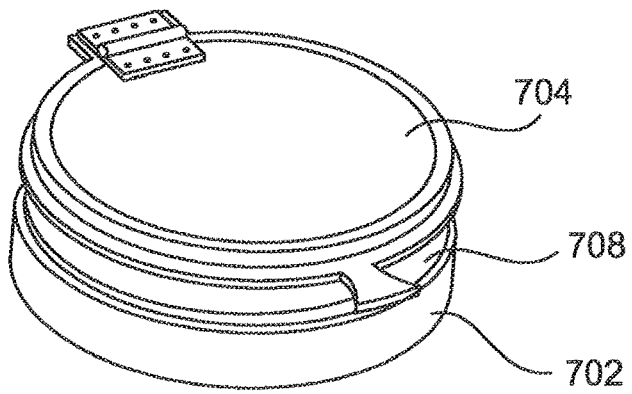
Figure 7C:
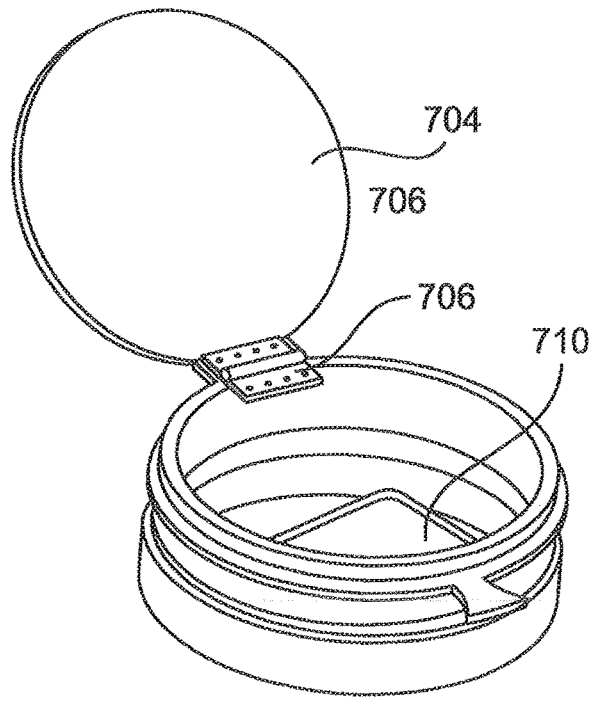

Reference is now made to FIGS. 7A-C illustrating an extendable safe in accordance with an exemplary embodiment. Safe 700 is shown to have a rounded shaped container 702 with a cover 704 that can be opened about a hinge 706. The safe 700, as shown in FIG. 7B can be extended using a side extender 708 to have a larger volume, when necessary. One can use different methods to extend the volume of the container 702. It should be noted that any other option in which the safe can be extended to a larger volume such as telescopic extention, linear extension, folded extension etc. can be used without limiting the scope of the subject matter.

In FIG. 7C, the cover 704 is in an open state so as to see the safe to have an item 710 such as a smartphone.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A transportable safe configured to be secured to a solid object and withstand attempts to remove content from the safe or removal of the safe itself by an unauthorized entity, the transportable safe comprising:
   a safe body;
   a fastener fixedly attached to the safe body;
   at least one concealable connector configured to connect the fastener and the solid object; and
   a housing configured to freely slide along the fastener to conceal the concealable connector when the housing is accommodating the connector,
   wherein said at least one concealable connector is configured to be accommodated and concealed within the housing that is fixed on the fastener in a certain position to conceal and secure the safe.

2. The transportable safe of claim 1, comprising at least one lock configured to lock the safe body.

3. The transportable safe of claim 2, further comprising an opening configured to allow placement of small objects in the safe and to prevent removal of small objects from the safe without using the lock.

4. The transportable safe of claim 1, wherein said fastener is a cable.

5. The transportable safe of claim 4, wherein said cable is flexible.

6. The transportable safe of claim 4, wherein said cable is made of a material selected from the group consisting of metal, metallic alloy, and reinforced plastic.

7. The transportable safe of claim 1, wherein the solid object is a part of a vehicle and the safe body is configured to be concealed in the vehicle.

8. The transportable safe of claim 7, wherein the safe is configured to be concealed within an accessory of a vehicle.

9. A child safety seat comprising a compartment configured to accommodate a concealed safe of claim 7.

10. The child safety seat of claim 9, wherein the compartment is positioned and incorporated under a seat surface of the child safety seat.

11. The transportable safe of claim 1, wherein the safe is collapsible.

12. The transportable safe of claim 1, further comprising an alarm.

13. The transportable safe of claim 12, wherein the alarm is configured to be actuated when at least one of the following unauthorized activities happens: there is an attempt to break-in the safe, there is an attempt to open at least one lock of the safe, there is an attempt to remove the safe, there is an attempt to release or break said at least one fastener, or there is an attempt to open reach the connector.

14. The transportable safe of claim 1, further comprising a positioning system.

15. The transportable safe of claim 1, wherein the housing is configured to be withdrawn by sliding on the fastener in a direction that is distant from the concealable connector and reveal the connector.

16. The transportable safe of claim 15, wherein a key is provided to fix said housing in a position on the fastener in which the concealable connector is concealed and to release said housing to withdraw the housing from the connector that is concealed and to reveal it.

17. The transportable safe of claim 15, wherein said housing is connected to a box that encloses said fastener and wherein said box is configured to slide on said fastener and wherein said box is provided with a key.

18. The transportable safe of claim 17, wherein said key is adapted to allow or prevent the box from sliding along the fastener.

19. The transportable safe of claim 1, wherein the at least one connector is selected from the group consisting of a male buckle and an Isofix connector.

* * * * *